US012592659B2

(12) United States Patent
Zhang et al.

(10) Patent No.: US 12,592,659 B2
(45) Date of Patent: Mar. 31, 2026

(54) SINGLE LIVE WIRED SPEED CONTROL CIRCUIT OF CEILING FAN MOTOR

(71) Applicant: Foshan Carro Electrical Co., Ltd., Foshan (CN)

(72) Inventors: Jian-Sheng Zhang, Foshan (CN); Likui Xu, Foshan (CN)

(73) Assignee: Foshan Carro Electrical Co., Ltd., Foshan (CN)

( * ) Notice: Subject to any disclaimer, the term of this patent is extended or adjusted under 35 U.S.C. 154(b) by 166 days.

(21) Appl. No.: 18/611,745

(22) Filed: Mar. 21, 2024

(65) Prior Publication Data

US 2025/0211153 A1     Jun. 26, 2025

(30) Foreign Application Priority Data

Dec. 22, 2023     (CN) .......................... 202323538731.5

(51) Int. Cl.
H02P 23/16          (2016.01)
H02P 25/03          (2016.01)
(52) U.S. Cl.
CPC .............. H02P 23/16 (2016.02); H02P 25/03 (2016.02)

(58) Field of Classification Search
CPC .. H02P 25/03; H02P 23/16; H02P 6/08; F04D 25/08; F04D 27/00
See application file for complete search history.

(56) References Cited

FOREIGN PATENT DOCUMENTS

CN          110608186 A  * 12/2019  ........... F04D 27/004

* cited by examiner

*Primary Examiner* — Said Bouziane
(74) *Attorney, Agent, or Firm* — WPAT, PC

(57)          ABSTRACT

A single live wired speed control circuit of a ceiling fan motor includes a single live wire (SLW) electricity acquisition unit that is electrically connected to a live wire of an alternate current (AC) circuit, a chopper unit that is electrically connected to the live wire in series, and a control unit and a speed control unit that are electrically connected to each other. The SLW electricity acquisition unit acquires electricity from the live wire in an environment for the control unit. The speed control unit outputs voltage signals of various voltages to the control unit. The control unit outputs various control signals to the chopper unit. The chopper unit chops one of the received control signals into a chopped signal to output through the live wire to the ceiling fan motor of a ceiling fan, and thus avoid modifying a pre-existing circuitry of the environment.

14 Claims, 3 Drawing Sheets

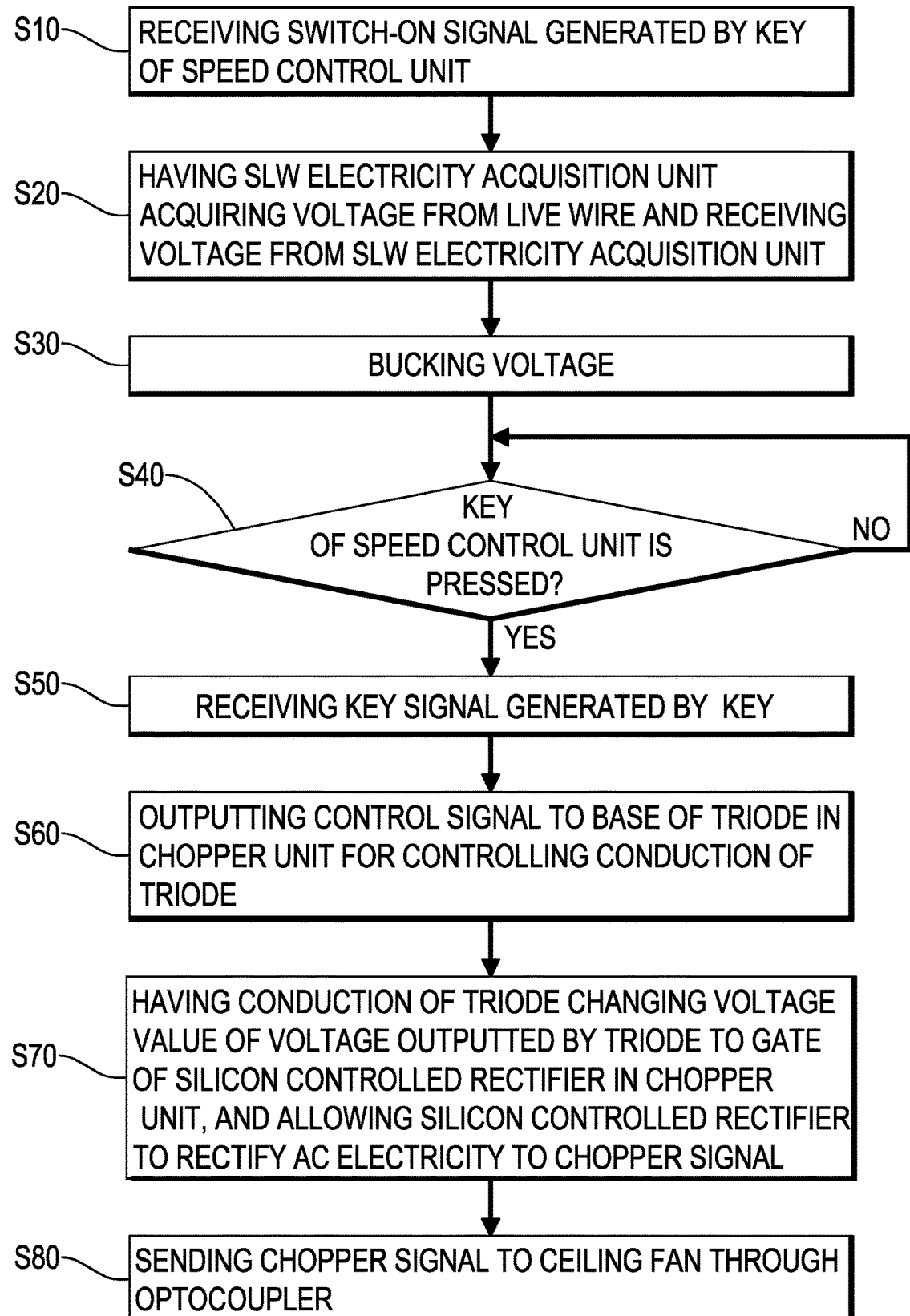

S10 — RECEIVING SWITCH-ON SIGNAL GENERATED BY KEY OF SPEED CONTROL UNIT

S20 — HAVING SLW ELECTRICITY ACQUISITION UNIT ACQUIRING VOLTAGE FROM LIVE WIRE AND RECEIVING VOLTAGE FROM SLW ELECTRICITY ACQUISITION UNIT

S30 — BUCKING VOLTAGE

S40 — KEY OF SPEED CONTROL UNIT IS PRESSED?    NO

YES

S50 — RECEIVING KEY SIGNAL GENERATED BY KEY

S60 — OUTPUTTING CONTROL SIGNAL TO BASE OF TRIODE IN CHOPPER UNIT FOR CONTROLLING CONDUCTION OF TRIODE

S70 — HAVING CONDUCTION OF TRIODE CHANGING VOLTAGE VALUE OF VOLTAGE OUTPUTTED BY TRIODE TO GATE OF SILICON CONTROLLED RECTIFIER IN CHOPPER UNIT, AND ALLOWING SILICON CONTROLLED RECTIFIER TO RECTIFY AC ELECTRICITY TO CHOPPER SIGNAL

S80 — SENDING CHOPPER SIGNAL TO CEILING FAN THROUGH OPTOCOUPLER

FIG.3

SINGLE LIVE WIRED SPEED CONTROL CIRCUIT OF CEILING FAN MOTOR

CROSS-REFERENCE TO RELATED APPLICATION(S)

This application claims the priority benefit of CN application serial No. 2023235387315 filed on Dec. 22, 2023, the entirety of which is hereby incorporated by reference herein and made a part of the specification.

BACKGROUND OF THE INVENTION

1. Field of the Invention

The present invention relates to a technical field of a single live wired circuitry, more particularly a single live wired speed control circuit of a ceiling fan motor.

2. Description of the Related Art

In traditional households having conventional usage of electricity, for safety and cost-efficiency reasons, a mechanical switch controls an electronic device from a distance through a single live wire. More particularly, the mechanical switch and a control board of the electronic device are spatially independent in an environment having the electronic device. In this case, a neutral wire of an alternate current (AC) circuit is absent in the said environment to save installation costs.

However, in order to have a working ceiling fan in a traditional household, it is currently impossible to control a ceiling fan in the said environment without increasing installation costs of, namely, installing the neutral wire or alternatively installing wireless radio frequency (RF) controlling means for the ceiling fan. Both means of controlling the ceiling fan require complicated and costly modifications to a pre-existing circuitry of the environment.

SUMMARY OF THE INVENTION

The present invention provides a single live wired speed control circuit of a ceiling fan motor. The single live wired speed control circuit allows a user to completely replace a mechanical switch in a traditional household environment without having to modify a pre-existing circuitry of the traditional household environment having conventional usage of electricity. The single live wired speed control circuit allows electricity to flow into a control switch through a single live wire, and allows a control signal flow out of the single live wire to control a ceiling fan.

The single live wired speed control circuit of the present invention includes a chopper unit, a single live wire (SLW) electricity acquisition unit, a control unit, and a speed control unit.

A first contact and a second contact of the chopper unit are electrically connected to a live wire of an alternate current (AC) circuit, allowing the chopper unit to be electrically connected to the live wire of the AC circuit in series through the first contact and the second contact of the chopper unit. A control contact of the chopper unit is electrically connected to the control unit.

A first power contact of the SLW electricity acquisition unit is electrically connected to the live wire of the AC circuit, and a second power contact of the SLW electricity acquisition unit is electrically connected to the control unit.

The SLW electricity acquisition unit is configured to acquire electricity from the live wire of the AC circuit.

The control unit is electrically connected to the speed control unit. The speed control unit is configured to output voltage signals of various voltages to the control unit. The control unit is configured to receive the various voltages from the speed control unit and subsequently output various control signals to the chopper unit. The chopper unit is configured to receive one of the control signals outputted from the control unit. The chopper unit chops the control signal into a chopped signal and outputs the chopped signal through the live wire of the AC circuit.

In an embodiment, an environment with the AC circuit is a traditional household with a ceiling fan. The chopper unit outputs the chopped signal through the live wire of the AC circuit to a ceiling fan motor of the ceiling fan in the environment without a neutral wire of the AC circuit. The ceiling fan motor is a brushless direct current ceiling fan motor, and the chopper unit outputs the chopped signal through the live wire to the brushless direct current ceiling fan motor of the ceiling fan.

In an embodiment, the chopper unit comprises a silicon controlled rectifier and a triode, and the live wire comprises an input side and an output side; wherein the triode has a collector, a base, and an emitter; the base of the triode is electrically connected to the control unit, the emitter of the triode is electrically connected to a ground, and the collector of the triode is electrically connected to a voltage source; wherein the silicon controlled rectifier has an anode, a gate, and a cathode; the gate of the silicon controlled rectifier is electrically connected to the collector of the triode, the anode of the silicon controlled rectifier is electrically connected to the output side of the live wire, and the cathode of the silicon controlled rectifier is electrically connected to the input side of the live wire. The voltage source provides a 10-volt voltage acquired from the live wire.

In an embodiment, the live wire comprises an input side and an output side, and the SLW electricity acquisition unit comprises a triode for alternating current, a Zener diode, and a resistor; wherein the triode for alternating current has a first terminal, a gate, and a second terminal; the first terminal of the triode for alternating current is electrically connected to the output side of the live wire, the second terminal of the triode for alternating current is electrically connected to the input side of the live wire, and the resistor is electrically connected between the gate of the triode for alternating current and the input side of the live wire; wherein the Zener diode has an anode and a cathode; the anode of the Zener diode is electrically connected to the gate of the triode for alternating current, and the cathode of the Zener diode is electrically connected to the output side of the live wire.

In an embodiment, the SLW electricity acquisition unit comprises a capacitor; wherein the capacitor and the resistor each have two opposing sides, one of the sides of the capacitor is electrically connected to one of the sides of the resistor, the second terminal of the triode for alternating current, and the input side of the live wire; the other of the sides of the capacitor is electrically connected to the other of the sides of the resistor, the gate of the triode for alternating current, and the anode of the Zener diode.

In an embodiment, the control unit comprises a buck converter sub-unit, a controller sub-unit, and an indicator sub-unit; wherein the buck converter sub-unit is electrically connected to the SLW electricity acquisition unit and the controller sub-unit; the buck converter sub-unit bucks the voltage acquired from the SLW electricity acquisition unit for the controller sub-unit; wherein the controller sub-unit is electrically connected to the speed control unit, the indicator sub-unit, and the second power contact of the SLW electricity acquisition unit; the controller sub-unit is configured to receive the various voltages from the speed control unit and subsequently outputs various control signals to the chopper unit and output a light-up command signal to the indicator sub-unit.

In an embodiment, the buck converter sub-unit comprises a buck converter chip, and the buck converter chip bucks a voltage from the live wire three-folds.

In an embodiment, the controller sub-unit comprises a control chip of model ATM8F8040; wherein the model chip is electrically connected to the speed control unit, the indicator sub-unit, the buck converter sub-unit, and the second power contact of the SLW electricity acquisition unit; wherein the model chip receives a 3.3-volt voltage outputted by the buck converter sub-unit.

In an embodiment, the control unit comprises a keys sub-unit, and the keys sub-unit is electrically connected to the buck converter sub-unit, the controller sub-unit, and the speed control unit; wherein the keys sub-unit comprises multiple resistors, and each of the resistors has two opposing sides; one of the sides of each of the resistors is electrically connected to the buck converter sub-unit, the other side of each of the resistors is electrically connected to the controller sub-unit and the speed control unit.

In an embodiment, the resistors are pull-up resistors; the speed control unit comprises multiple keys; each of the keys is a switch, and each of the keys is electrically connected to a respective one of the resistors.

In an embodiment, the indicator sub-unit comprises a light-emitting diode, and the light emitting diode is electrically connected between the controller sub-unit and a ground.

Any one of the technical solutions listed above is able to provide the following benefits:

Having the SLW electricity acquisition unit for acquiring electricity from the live wire in the environment, and subsequently supplying the voltage to the control unit.

Having the control unit respectively electrically connected to the chopper unit and the speed control unit, and thus allowing the control unit to convert the various voltages received from the speed control unit to corresponding control signals. The control unit subsequently sends one of the various control signals to the chopper unit for controlling the chopper unit to output the chopped signal.

Since the chopper unit is connected in series with the live wire, the chopper unit formulates the chopped signal for controlling the ceiling fan by rectifying the control signal that is derived from an AC signal into the chopped signal, and then the chopper unit directly sends the chopped signal to the ceiling fan from the live wire. In comparison with prior arts, the present invention provides a smarter and more cost-efficient technical solution for controlling the ceiling fan in a technical field of a single live wired circuitry.

BRIEF DESCRIPTION OF THE DRAWINGS

FIG. 3 is a flow chart of an operation of the single live wired speed control circuit of the ceiling fan motor of the present invention.

DETAILED DESCRIPTION OF THE INVENTION

Figure 1:
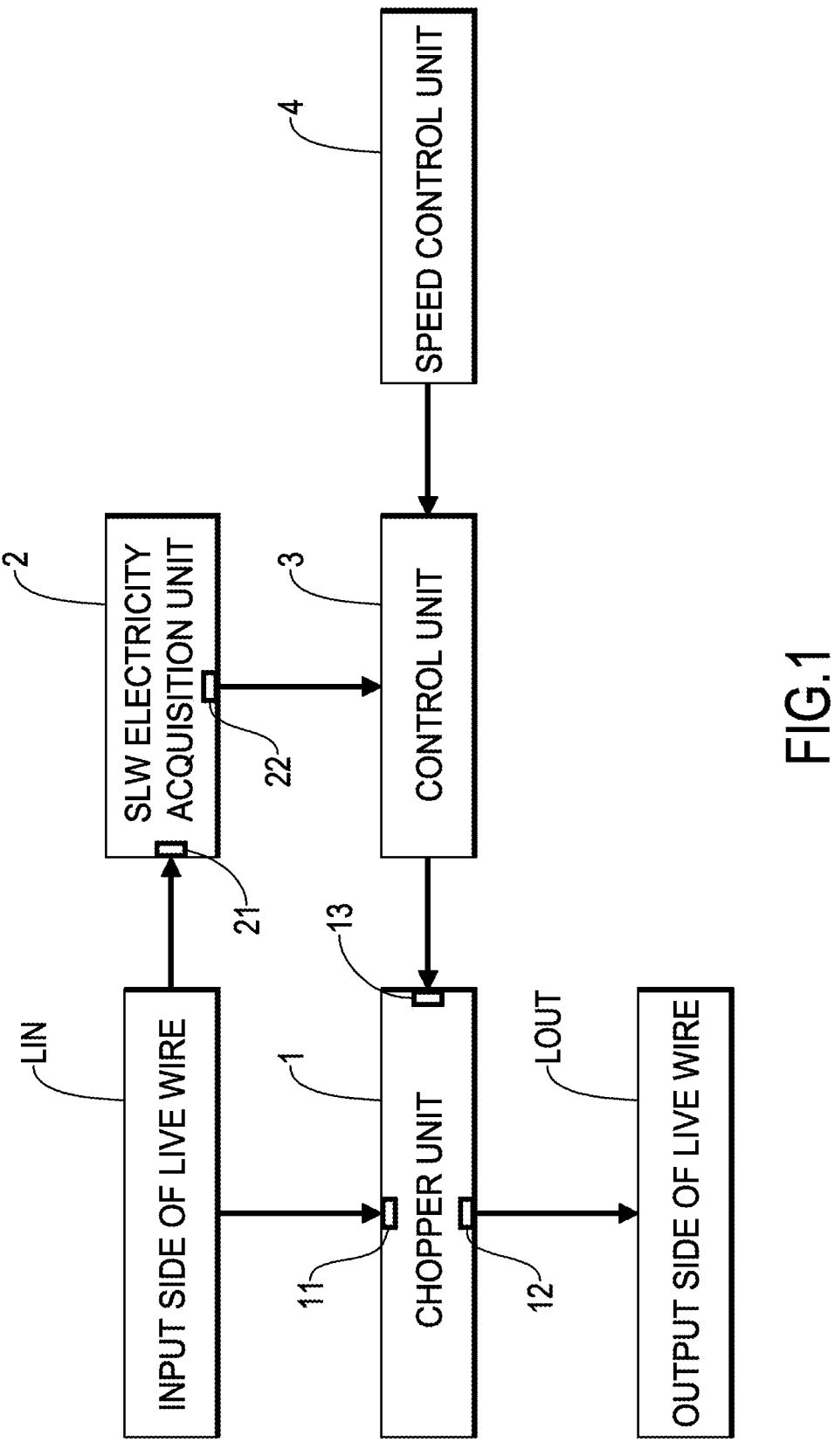
FIG. 1 is a block diagram of a single live wired speed control circuit of a ceiling fan motor of the present invention.
Figure 2:
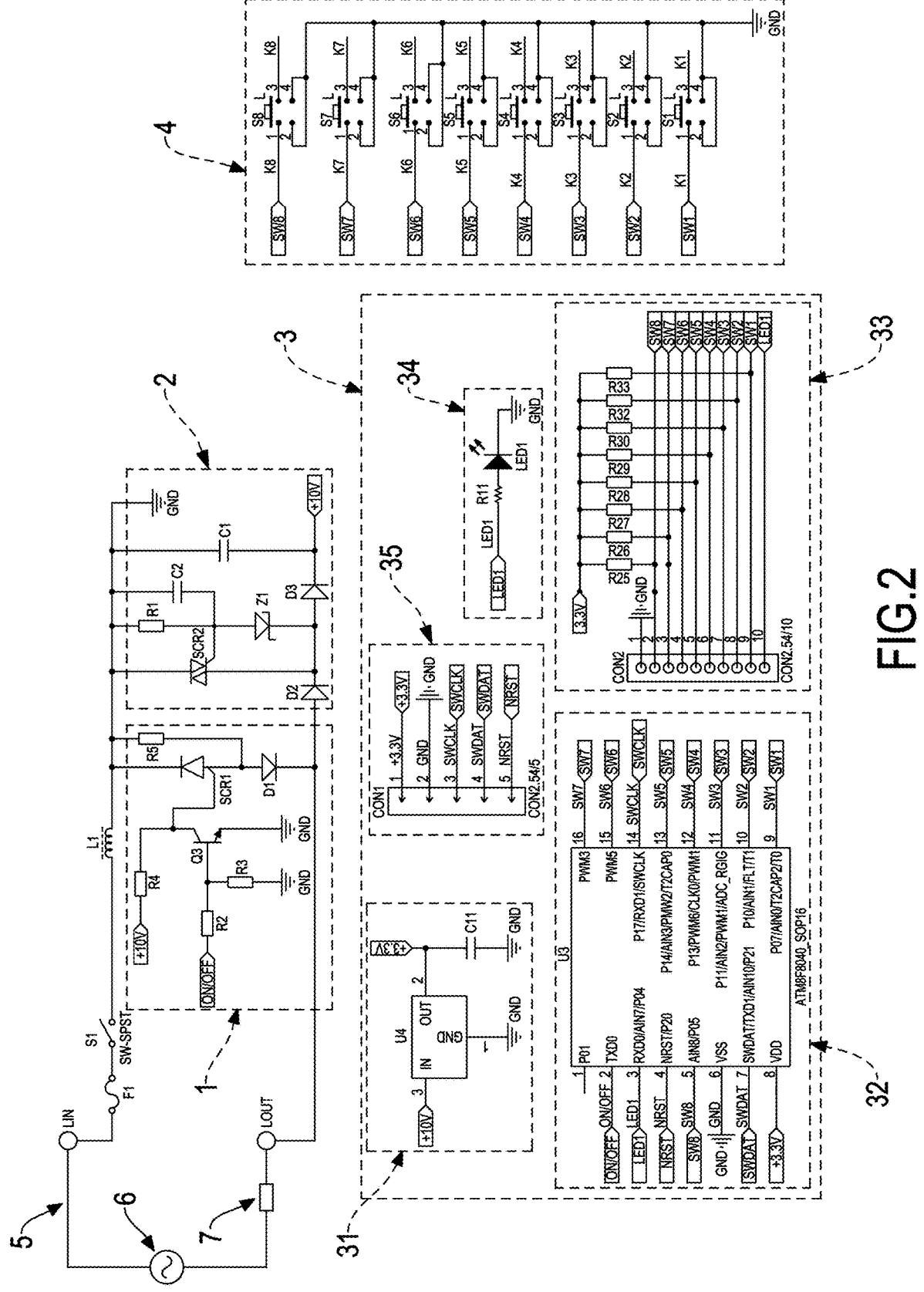
FIG. 2 is a schematic diagram of the single live wired speed control circuit of the ceiling fan motor of the present invention.

With reference to FIGS. 1 to 3, the present invention provides a single live wired speed control circuit of a ceiling fan motor. The single live wired speed control circuit includes a chopper unit 1, a single live wire (SLW) electricity acquisition unit 2, a control unit 3, and a speed control unit 4.

A first contact 11 and a second contact 12 of the chopper unit 1 are electrically connected to a live wire 5 of an alternate current (AC) circuit 6, allowing the chopper unit 1 to be electrically connected to the live wire 5 of the AC circuit 6 in series through the first contact 11 and the second contact 12 of the chopper unit 1. A control contact 13 of the chopper unit 1 is electrically connected to the control unit 3. The AC circuit 6, in the context of the present invention, can be represented as an AC source.

A first power contact 21 of the SLW electricity acquisition unit 2 is electrically connected to the live wire 5 of the AC circuit 6, and a second power contact 22 of the SLW electricity acquisition unit 2 is electrically connected to the control unit 3. The SLW electricity acquisition unit 2 is configured to acquire electricity from the live wire 5 in an environment.

The control unit 3 is electrically connected to the speed control unit 4. The speed control unit 4 is configured to output voltage signals of various voltages to the control unit 3. The control unit 3 is configured to receive the various voltages from the speed control unit 4 and subsequently output various control signals to the chopper unit 1. The various voltages received by the control unit have different voltage values. The chopper unit 1 is configured to receive one of the control signals outputted from the control unit 3. The chopper unit 1 chops the control signal into a chopped signal and outputs the chopped signal through the live wire 5 of the AC circuit 6.

In an embodiment, the environment with the AC circuit 6 is a traditional household with a ceiling fan, and the AC circuit 6 in the environment lacks a neutral wire. Such is the condition the SLW electricity acquisition unit 2 is under when acquiring the voltage from the live wire 5 and providing electricity for the control unit 3.

The control unit 3 is respectively electrically connected to the chopper unit and the speed control unit 4, and thus the control unit 3 converts the various voltages received from the speed control unit 4 to corresponding control signals. The control unit 3 then subsequently sends the various control signals to the chopper unit 1 for controlling the chopper unit 1 to output the corresponding chopped signal. As such, the chopper unit 1 outputs the chopped signal through the live wire 5 of the AC circuit 6 to the ceiling fan in the environment without a neutral wire of the AC circuit 6, as fitting in a technical field of having a single live wired circuitry connected to an electronic device.

Since the chopper unit 1 is connected in series with the live wire 5, the chopper unit 1 formulates the chopped signal for controlling the ceiling fan by rectifying the control signal that is derived from an AC signal into the chopped signal, and then the chopper unit 1 directly sends the chopped signal to a ceiling fan motor 7 of the ceiling fan from the live wire 5. In the context of the present invention, the ceiling fan motor 7 is represented as a load to the live wire 5. More particularly, the said ceiling fan motor is a brushless direct current ceiling fan motor 7 that has an AC-DC converter. The chopper unit 1 outputs the chopped signal through the live wire 5 to the AC-DC converter of the brushless direct current ceiling fan motor 7 of the ceiling fan. In comparison with prior arts, the present invention provides a smarter and more cost-efficient technical solution for controlling the ceiling fan in the technical field of the single live wired circuitry.

In an embodiment, the chopper unit 1 includes a silicon controlled rectifier SCR1, a resistor R2, a resistor R3, a resistor R4, a resistor R5, a diode D1, and a triode Q3. The silicon controlled rectifier SCR1 has an anode, a gate, and a cathode. The diode D1 has an anode and a cathode. The triode Q3 has a collector, a base, and an emitter. The live wire 5 has an input side LIN and an output side LOUT.

All of the resistors R2-R5 have two opposing sides. A side of the resistor R4 is electrically connected to a voltage source having a voltage of 10 volts that is acquired from the live wire 5, and the other side of the resistor R4 is respectively connected to the collector of the triode Q3 and the gate of the silicon controlled rectifier SCR1.

The base of the triode Q3 is respectively electrically connected to a side of the resistor R2 and a side of the resistor R3. The other side of the resistor R2 is electrically connected to the control unit 3, and the other side of the resistor R3 is electrically connected to the emitter of the triode Q3.

The anode of the silicon controlled rectifier SCR1 is respectively electrically connected to the SLW electricity acquisition unit 2, the anode of the diode D1, and a side of the resistor R5. The cathode of the silicon controlled rectifier SCR1 is electrically connected to the other side of the resistor R5, and both are then electrically connected to the input side LIN of the live wire 5 of the AC circuit 6 through an inductor L1. The cathode of the diode D1 is electrically connected to the output side LOUT of the live wire 5 of the AC circuit 6.

The control unit 3 outputs an ON/OFF signal as the control signal to the chopper unit 1. When the control unit 3 is idle without receiving a signal, the ON/OFF signal outputted by the control unit 3 is by default a long pulse set at a low voltage value. The ON/OFF signal at low voltage value prevents the triode Q3 from electrical conduction. As such, the voltage from the voltage source passes through the resistor R4 to the gate of the silicon controlled rectifier SCR1 and remains at a high voltage value, thus allowing the silicon controlled rectifier SCR1 to conduct AC electricity.

However, when the control unit 3 is actively receiving the various voltages outputted by the speed control unit 4, the control unit 3 then outputs the ON/OFF signal at a high voltage value in correspondence to the various voltages received. As such, the ON/OFF signal of various voltage values outputted by the control unit 3 switches the triode Q3 to conduct electricity. As such, the voltage from the voltage source passes through the resistor R4 directly to a ground GND, shorting the gate of the silicon controlled rectifier SCR1, and drops to a low voltage value. This allows the silicon controlled rectifier SCR1 to be swiftly prevented from conducting the AC electricity, and hence allows for a swift, time-efficient, and reliable rectification of the AC electricity from the silicon controlled rectifier SCR1.

Furthermore, the SLW electricity acquisition unit 2 includes a triode for alternating current SCR2, a resistor R1, an electrolytic capacitor C1, a capacitor C2, a Zener diode Z1, a diode D2, and a diode D3. The resistor R1, the electrolytic capacitor C1, and the capacitor C2 all respectively have two opposing sides. The triode for alternating current SCR2 has a first terminal, a gate, and a second terminal. The Zener diode Z1, the diode D2, and the diode D3 all respectively have an anode and a cathode.

The second terminal of the triode for alternating current SCR2, a side of the resistor R1, a side of the electrolytic capacitor C1, and a side of the capacitor C2 are all electrically connected to the ground GND. Moreover, the ground GND is electrically connected to the input side LIN of the live wire 5 of the AC circuit 6 through the inductor L1. The first terminal of the triode for alternating current SCR2 is electrically connected to the cathode of the diode D2, the anode of the diode D3, and the cathode of the Zener diode Z1. The gate of the triode for alternating current SCR2 is electrically connected to the other side of the resistor R1, the other side of the capacitor C2, and the anode of the Zener diode Z1. The other side of the electrolytic capacitor C1 and the cathode of the diode D3 are connected to the voltage source having the voltage of 10 volts.

The resistor R1 and the capacitor C2 serve as filters. The Zener diode Z1 is configured to limit the voltage value to be less than 10 volts when outputting electricity to the ceiling fan to switch-ON the ceiling fan. As such, the Zener diode Z1 helps to avoid outputting excessive voltage values when switching-ON the ceiling fan. The resistor R1 and the capacitor C2 help to prevent electromagnetic interferences when switching ON or OFF the ceiling fan. Together the resistor R1, the capacitor C2, and the Zener diode Z1 help distinguish the present invention from prior arts in the technical field of the single live wired circuitry.

The control unit 3 includes a buck converter sub-unit 31, a controller sub-unit 32, a keys sub-unit 33, an indicator sub-unit 34, and a connection sub-unit 35.

The buck converter sub-unit 31 receives the 10-volt voltage from the SLW electricity acquisition unit 2, converts the 10-volt voltage down into a 3.3-volt voltage, and outputs the 3.3-volt voltage to the controller sub-unit 32, the keys sub-unit 33, the indicator sub-unit 34, and the connection sub-unit 35 respectively.

The controller sub-unit 32 is respectively electrically connected to the keys sub-unit 33 and the indicator sub-unit 34. The keys sub-unit 33 is configured to generate voltages of different voltage values to the controller sub-unit 32 by electrically connecting both the keys sub-unit 33 and the controller sub-unit 32 and serving as a voltage divider. The indicator sub-unit 34 indicates a key status of the keys sub-unit 33. The controller sub-unit 32 receives the different voltage values coming from the speed control unit 4 and correspondingly sends out various command signals to the chopper unit 1. Simultaneously, the controller sub-unit 32 sends out a light-up command signal to the indicator sub-unit 34.

Furthermore, the buck converter sub-unit 31 includes a buck converter chip U4 and a capacitor C11. The buck converter chip U4 includes a ground pin, an output pin, and an input pin. The capacitor C11 has two opposing sides.

The input pin of the buck converter chip U4 is electrically connected to the chopper unit 1 and the SLW electricity acquisition unit 2.

The output pin of the buck converter chip U4 is electrically connected to a side of the capacitor C11, and the output pin of the buck converter chip U4 outputs the 3.3-volt voltage respectively to the controller sub-unit 32 and the keys sub-unit 33. In other words, in the present embodiment, the buck converter chip U4 bucks the 10-volt voltage taken from the live wire 5 three-folds into the 3.3-volt voltage.

The ground pin of the buck converter chip U4 and the other side of the capacitor C11 are electrically connected to the ground GND.

The controller sub-unit 32 includes a control chip U3. The buck converter chip U4 and the capacitor C11 form a buck converter circuit to convert the 10-volt voltage acquired from the live wire 5 into the 3.3-volt voltage that is supplied to the control chip U3.

In an embodiment, the control chip U3 is of model ATM8F8040. In this case, the control chip U3 includes a total of 16 pins.

A $1^{st}$ pin of the control chip U3 is an open circuit.

A $2^{nd}$ pin of the control chip U3 is electrically connected to the chopper unit 1.

A $3^{rd}$ pin of the control chip U3 is electrically connected to the indicator sub-unit 34.

A $4^{th}$ pin, a $7^{th}$ pin, and a $14^{th}$ pin of the control chip U3 are electrically connected to the connection sub-unit 35.

A $5^{th}$ pin, a $9^{th}$ pin, a $10^{th}$ pin, an $11^{th}$ pin, a $12^{th}$ pin, a $13^{th}$ pin, a $15^{th}$ pin, and a $16^{th}$ pin are electrically connected to the keys sub-unit 33.

A $6^{th}$ pin of the control chip U3 is electrically connected to the ground GND.

An $8^{th}$ pin of the control chip U3 is electrically connected to the output pin of the buck converter chip U4 for receiving the 3.3-volt voltage.

In practice, when using the speed control unit 4 to generate different voltages, the control chip U3 detects voltage changes in its pins. The control chip U3 analyzes the voltage changes on its pins and subsequently generates the control signals according to the voltage changes. The control chip U3 then sends the control signals to the ceiling fan for controlling the ceiling fan in various ways.

The keys sub-unit 33 includes a port CON2 and eight pull-up resistors, and the speed control unit 4 includes eight keys. Each of the eight keys includes two opposing sides. The eight pull-up resistors also each include two opposing sides. The port CON2 includes 10 pins, and among the 10 pins, a first pin of the port CON2 is electrically connected to the ground GND.

One side of each of the eight keys is electrically connected to the ground GND. The other side of each of the eight keys is respectively electrically connected to a side of a respective one of the eight pull-up resistors and a respective one of the pins among a $2^{nd}$ pin to a $9^{th}$ pin of the port CON2. The other sides of all the eight pull-up resistors are connected to the output pin of the buck converter chip U4 for receiving the 3.3-volt voltage. A $10^{th}$ pin of the port CON2 is electrically connected to the control chip U3 and the indicator sub-unit 34.

With reference to FIG. 2, the eight keys correspond to eight switches, and the eight keys are a key S1, a key S2, a key S3, a key S4, a key S5, a key S6, a key S7, and a key S8, respectively. The eight pull-up resistors are a resistor R25, a resistor R26, a resistor R27, a resistor R28, a resistor R29, a resistor R30, a resistor R31, a resistor R32, and a resistor R33, respectively.

Please note that the speed control unit 4 may be controlled by a user in one or more than one way. For example, the speed control unit 4 may be configured to be controlled with a combination of the user pulling a string attached to one of the keys S1-S8 to generate an action signal, the user flipping one of the keys S1-S8 with a finger to generate the action signal, or the user pressing one of the keys S1-S8 to generate the action signal, etc. In either case, the action signal generated by any one of the keys S1-S8 to the control chip U3 enables the control chip U3 to control the speed control unit 4 to adjust a speed of the ceiling fan.

The indicator sub-unit 34 includes a resistor R11 and an indicator light LED1. In the present embodiment, the indicator light LED1 is a light-emitting diode. The resistor R11 and the indicator light LED1 each have two different opposing sides. A side of the resistor R11 is electrically connected to the control chip U3, another side of the resistor R11 is electrically connected to a side of the indicator light LED1, and the other side of the indicator light LED1 is electrically connected to the ground GND. When the indicator light LED1 receives the light-up command signal from the control chip U3 through the resistor R11, the indicator light LED1 lights up to indicate the key status of the keys sub-unit 33 being enabled.

When the keys S1-S8 are idle and without generating the action signal, the pins of the control chip U3 are defaulted to receive voltages of high voltage values. When any one of the keys S1-S8 is enabled by the user and correspondingly generates the action signal to the control chip U3, the corresponding pin of the control chip U3 receives the action signal as having a low voltage value, and thus the indicator light LED1 lights up, indicating that the control chip U3 has received the action signal.

With reference to FIG. 3, FIG. 3 shows a flow chart of an operation of the single live wired speed control circuit in an embodiment of the present invention. The operation is executed by a control unit, and the operation includes the following steps:

Step S10: receiving a switch-ON signal generated by a key of a speed control unit;

Step S20: having an SLW electricity acquisition unit acquiring a voltage from a live wire and receiving the voltage from the SLW electricity acquisition unit;

Step S30: bucking the voltage;

Step S40: scanning voltage changes to determine whether a key of the speed control unit is pressed; when determining the key of the speed control unit is idle, executing step S40;

Step S50: when determining the key of the speed control unit is pressed, receiving a key signal generated by the key;

Step S60: outputting a control signal of a voltage value corresponding to the key signal to a base of a triode in a chopper unit for controlling a conduction of the triode;

Step S70: having the conduction of the triode changing a voltage value of a voltage outputted by the triode to a gate of a silicon controlled rectifier in the chopper unit, thus allowing the silicon controlled rectifier to rectify an AC electricity to a chopped signal;

Step S80: sending the chopped signal to a ceiling fan through an optocoupler.

What is claimed is:

1. A single live wired speed control circuit of a ceiling fan motor, comprising:

a single live wire (SLW) electricity acquisition unit, having a first power contact and a second power contact; wherein the first power contact of the SLW electricity acquisition unit is connected to a live wire of an alternate current (AC) circuit for acquiring electricity;

a speed control unit, configured to output voltage signals of various voltages;

a control unit, electrically connected to the speed control unit and the second power contact of the SLW electricity acquisition unit, and configured to receive the various voltages from the speed control unit and subsequently output various control signals; and a chopper unit, having a first contact, a second contact, and a control contact; wherein the control contact is electrically connected to the control unit; wherein the chopper unit is electrically connected to the live wire of the AC circuit in series through the first contact and the second contact of the chopper unit;

wherein the chopper unit is configured to receive one of the control signals outputted from the control unit, and the chopper unit chops the received control signal into a chopped signal and outputs the chopped signal through the live wire of the AC circuit;

wherein the chopper unit comprises a silicon controlled rectifier and a triode, and the live wire comprises an input side and an output side;

wherein the triode has a collector, a base, and an emitter; the base of the triode is electrically connected to the control unit, the emitter of the triode is electrically connected to a ground, and the collector of the triode is electrically connected to a voltage source; and wherein the silicon controlled rectifier has an anode, a gate, and a cathode; the gate of the silicon controlled rectifier is electrically connected to the collector of the triode, the anode of the silicon controlled rectifier is electrically connected to the output side of the live wire, and the cathode of the silicon controlled rectifier is electrically connected to the input side of the live wire.

2. The single live wired speed control circuit as claimed in claim 1, wherein the chopper unit outputs the chopped signal through the live wire of the AC circuit to a ceiling fan motor of a ceiling fan in an environment without a neutral wire of the AC circuit.

3. The single live wired speed control circuit as claimed in claim 2, wherein the ceiling fan motor is a brushless direct current ceiling fan motor, and the chopper unit outputs the chopped signal through the live wire to the brushless direct current ceiling fan motor of the ceiling fan.

4. The single live wired speed control circuit as claimed in claim 1, wherein the voltage source provides a 10-volt voltage acquired from the live wire.

5. The single live wired speed control circuit as claimed in claim 1, wherein the SLW electricity acquisition unit comprises a triode for alternating current, a Zener diode, and a resistor;

wherein the triode for alternating current has a first terminal, a gate, and a second terminal; the first terminal of the triode for alternating current is electrically connected to the output side of the live wire, the second terminal of the triode for alternating current is electrically connected to the input side of the live wire, and the resistor is electrically connected between the gate of the triode for alternating current and the input side of the live wire; and wherein the Zener diode has an anode and a cathode; the anode of the Zener diode is electrically connected to the gate of the triode for alternating current, and the cathode of the Zener diode is electrically connected to the output side of the live wire.

6. The single live wired speed control circuit as claimed in claim 5, wherein the SLW electricity acquisition unit comprises a capacitor;

wherein the capacitor and the resistor each have two opposing sides, one of the sides of the capacitor is electrically connected to one of the sides of the resistor, the second terminal of the triode for alternating current, and the input side of the live wire; the other of the sides of the capacitor is electrically connected to the other of the sides of the resistor, the gate of the triode for alternating current, and the anode of the Zener diode.

7. The single live wired speed control circuit as claimed in claim 1, wherein the control unit comprises a buck converter sub-unit, a controller sub-unit, and an indicator sub-unit;

wherein the buck converter sub-unit is electrically connected to the SLW electricity acquisition unit and the controller sub-unit; the buck converter sub-unit bucks the voltage acquired from the SLW electricity acquisition unit for the controller sub-unit; and wherein the controller sub-unit is electrically connected to the speed control unit, the indicator sub-unit, and the second power contact of the SLW electricity acquisition unit; the controller sub-unit is configured to receive the various voltages from the speed control unit and subsequently outputs various control signals to the chopper unit and output a light-up command signal to the indicator sub-unit.

8. The single live wired speed control circuit as claimed in claim 7, wherein the buck converter sub-unit comprises a buck converter chip, and the buck converter chip bucks a voltage from the live wire three-folds.

9. The single live wired speed control circuit as claimed in claim 7, wherein the controller sub-unit comprises a control chip of model ATM8F8040;

wherein the model chip is electrically connected to the speed control unit, the indicator sub-unit, the buck converter sub-unit, and the second power contact of the SLW electricity acquisition unit; and wherein the model chip receives a 3.3-volt voltage outputted by the buck converter sub-unit.

10. The single live wired speed control circuit as claimed in claim 7, wherein the control unit comprises a keys sub-unit, and the keys sub-unit is electrically connected to the buck converter sub-unit, the controller sub-unit, and the speed control unit; and wherein the keys sub-unit comprises multiple resistors, and each of the resistors has two opposing sides; one of the sides of each of the resistors is electrically connected to the buck converter sub-unit, the other side of each of the resistors is electrically connected to the controller sub-unit and the speed control unit.

11. The single live wired speed control circuit as claimed in claim 10, wherein the resistors are pull-up resistors; and wherein the speed control unit comprises multiple keys; each of the keys is a switch, and each of the keys is electrically connected to a respective one of the resistors.

12. The single live wired speed control circuit as claimed in claim 11, wherein the keys sub-unit comprises a port with multiple pins; and wherein each of the resistors and each of the keys are electrically connected to the controller sub-unit through a respective one of the pins of the port.

13. The single live wired speed control circuit as claimed in claim 7, wherein the indicator sub-unit comprises a light-emitting diode, and the light emitting diode is electrically connected between the controller sub-unit and a ground.

14. The single live wired speed control circuit as claimed in claim 13, wherein the indicator sub-unit comprises a resistor; and wherein the light-emitting diode is electrically connected to the controller sub-unit through the resistor.

* * * * *